No. 711,772. Patented Oct. 21, 1902.
F. H. KINDL.
UNLOADING APPARATUS.
(Application filed Jan. 22, 1902.)

(No Model.) 11 Sheets—Sheet 1.

WITNESSES

INVENTOR

No. 711,772. Patented Oct. 21, 1902.
F. H. KINDL.
UNLOADING APPARATUS.
(Application filed Jan. 22, 1902.)

(No Model.) 11 Sheets—Sheet 2.

WITNESSES

INVENTOR
F. H. Kindl
by Bakewell & Byrnes
his attys.

No. 711,772. Patented Oct. 21, 1902.
F. H. KINDL.
UNLOADING APPARATUS.
(Application filed Jan. 22, 1902.)

(No Model.) 11 Sheets—Sheet 3.

WITNESSES
INVENTOR
F. H. Kindl
by Bakewell & Byrnes
his attys.

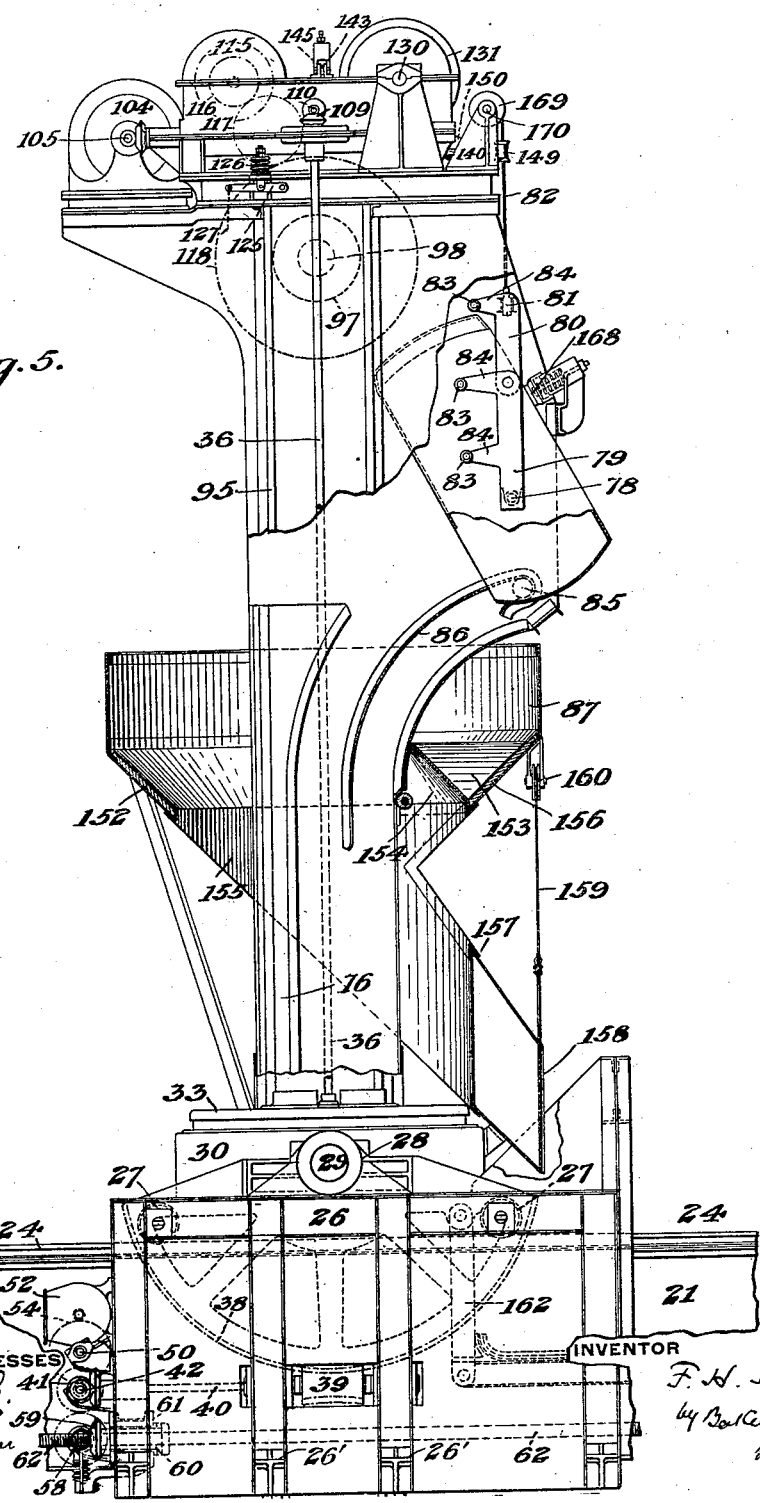

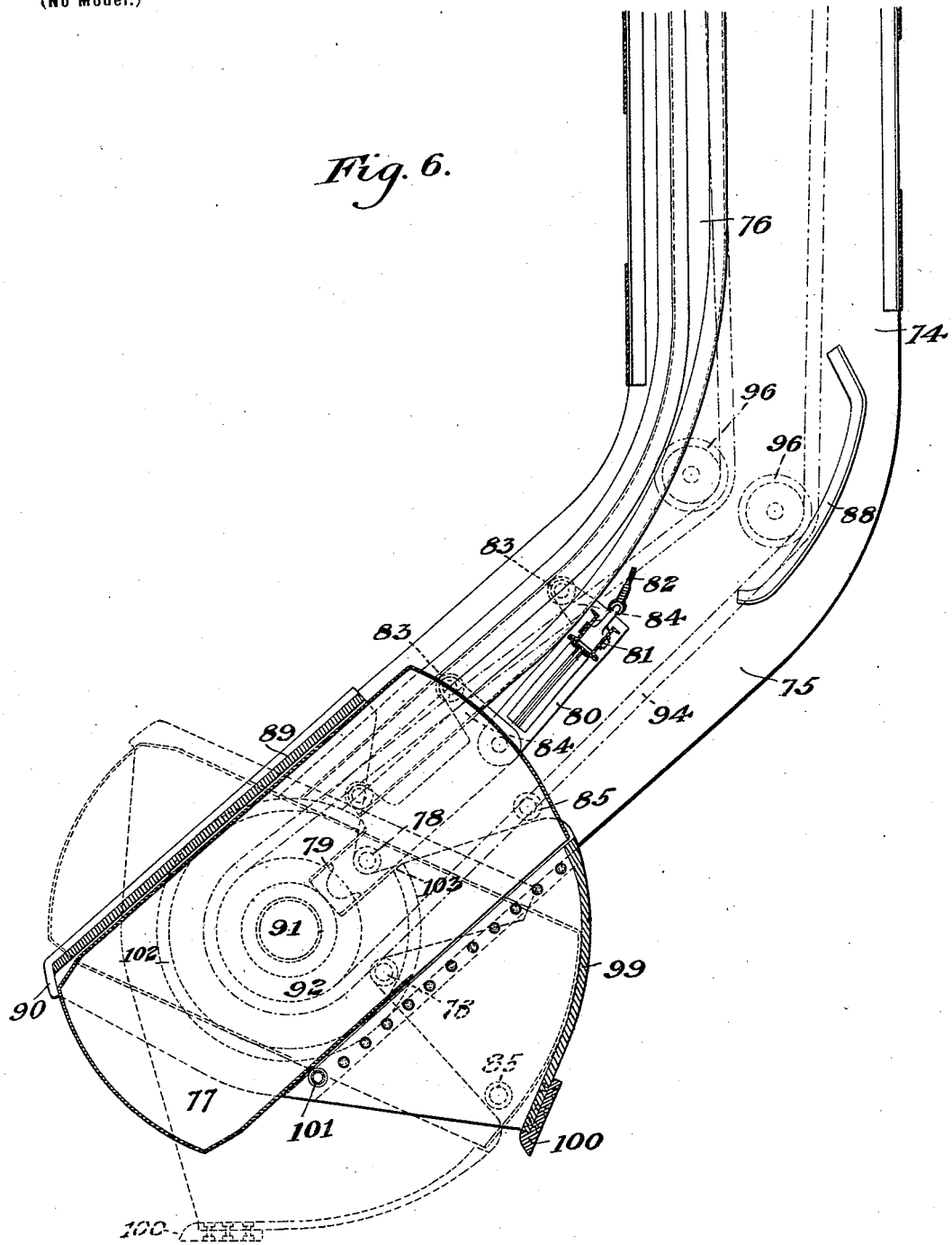

No. 711,772. Patented Oct. 21, 1902.
F. H. KINDL.
UNLOADING APPARATUS.
(Application filed Jan. 22, 1902.)
(No Model.) 11 Sheets—Sheet 6.
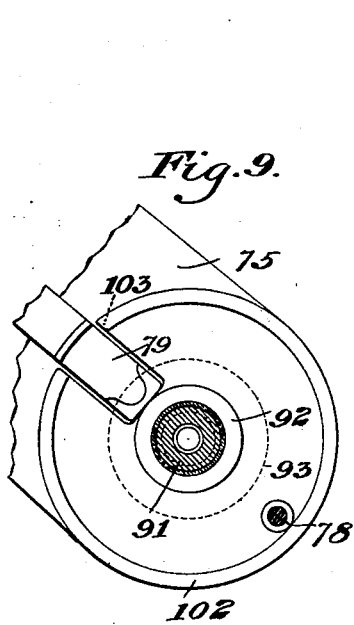
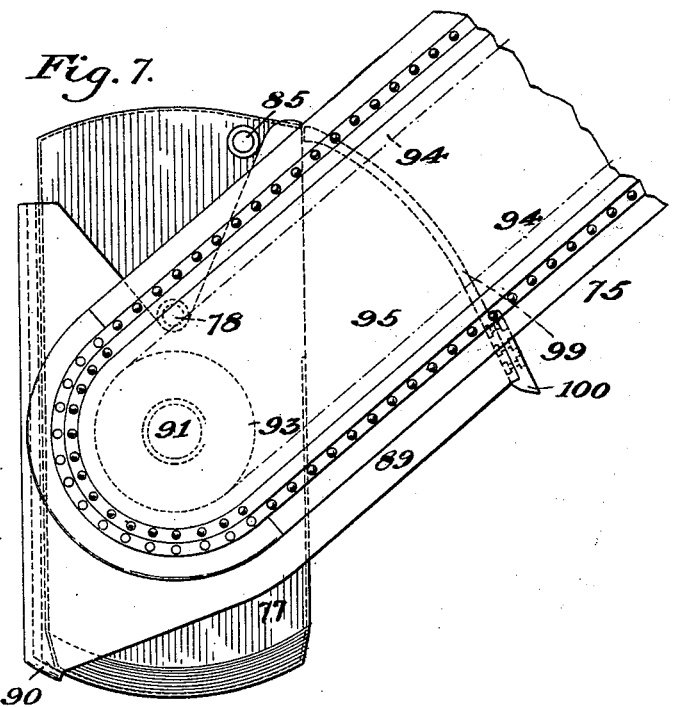
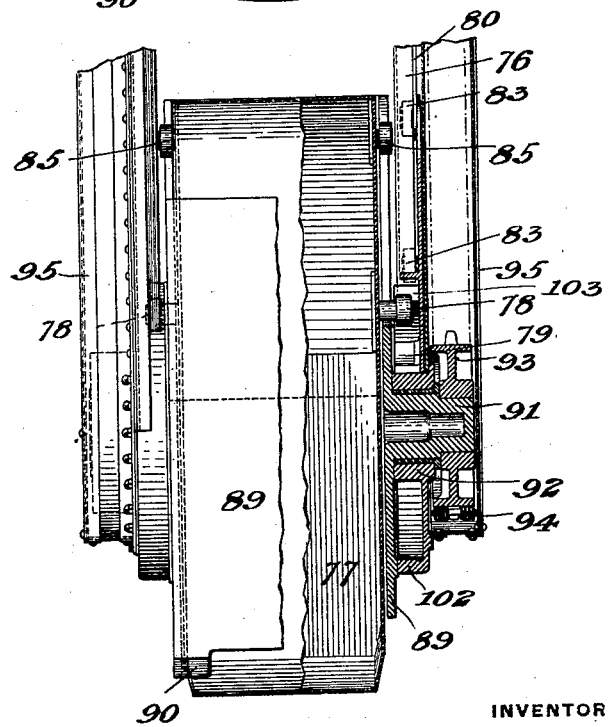
WITNESSES
INVENTOR No. 711,772. Patented Oct. 21, 1902.
F. H. KINDL.
UNLOADING APPARATUS.
(Application filed Jan. 22, 1902.)

(No Model.) 11 Sheets—Sheet 7.

No. 711,772. Patented Oct. 21, 1902.
F. H. KINDL.
UNLOADING APPARATUS.
(Application filed Jan. 22, 1902.)
(No Model.) 11 Sheets—Sheet 9.

No. 711,772. Patented Oct. 21, 1902.
F. H. KINDL.
UNLOADING APPARATUS.
(Application filed Jan. 22, 1902.)
(No Model.) 11 Sheets—Sheet 10.

WITNESSES
INVENTOR
F. H. Kindl
by Bakewell & Byrnes
his attys.

No. 711,772. Patented Oct. 21, 1902.
F. H. KINDL.
UNLOADING APPARATUS.
(Application filed Jan. 22, 1902.)
(No Model.) 11 Sheets—Sheet 11.
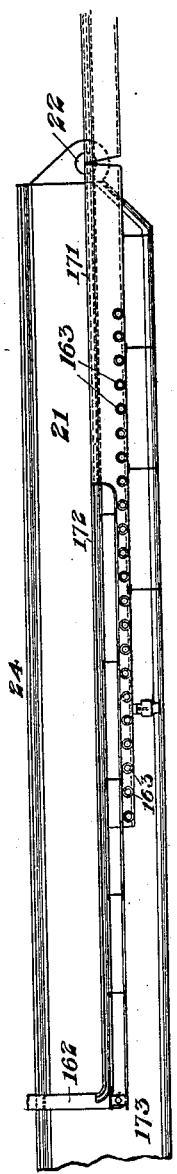
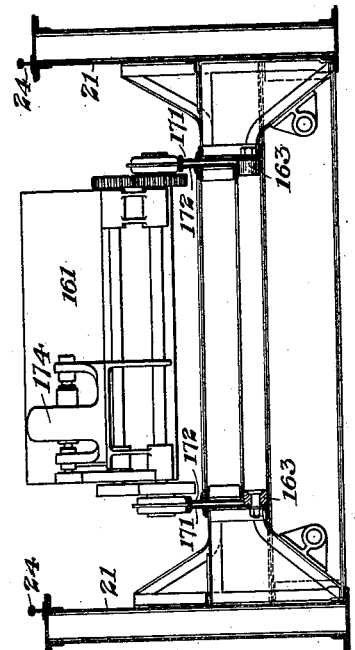
WITNESSES
INVENTOR

UNITED STATES PATENT OFFICE.

FREDERICK H. KINDL, OF PITTSBURG, PENNSYLVANIA.

UNLOADING APPARATUS.

SPECIFICATION forming part of Letters Patent No. 711,772, dated October 21, 1902.

Application filed January 22, 1902. Serial No. 90,770. (No model.)

*To all whom it may concern:*

Be it known that I, FREDERICK H. KINDL, of Pittsburg, Allegheny county, Pennsylvania, have invented a new and useful Unloading Apparatus, of which the following is a full, clear, and exact description, reference being had to the accompanying drawings, forming part of this specification, in which—

Figure 1:
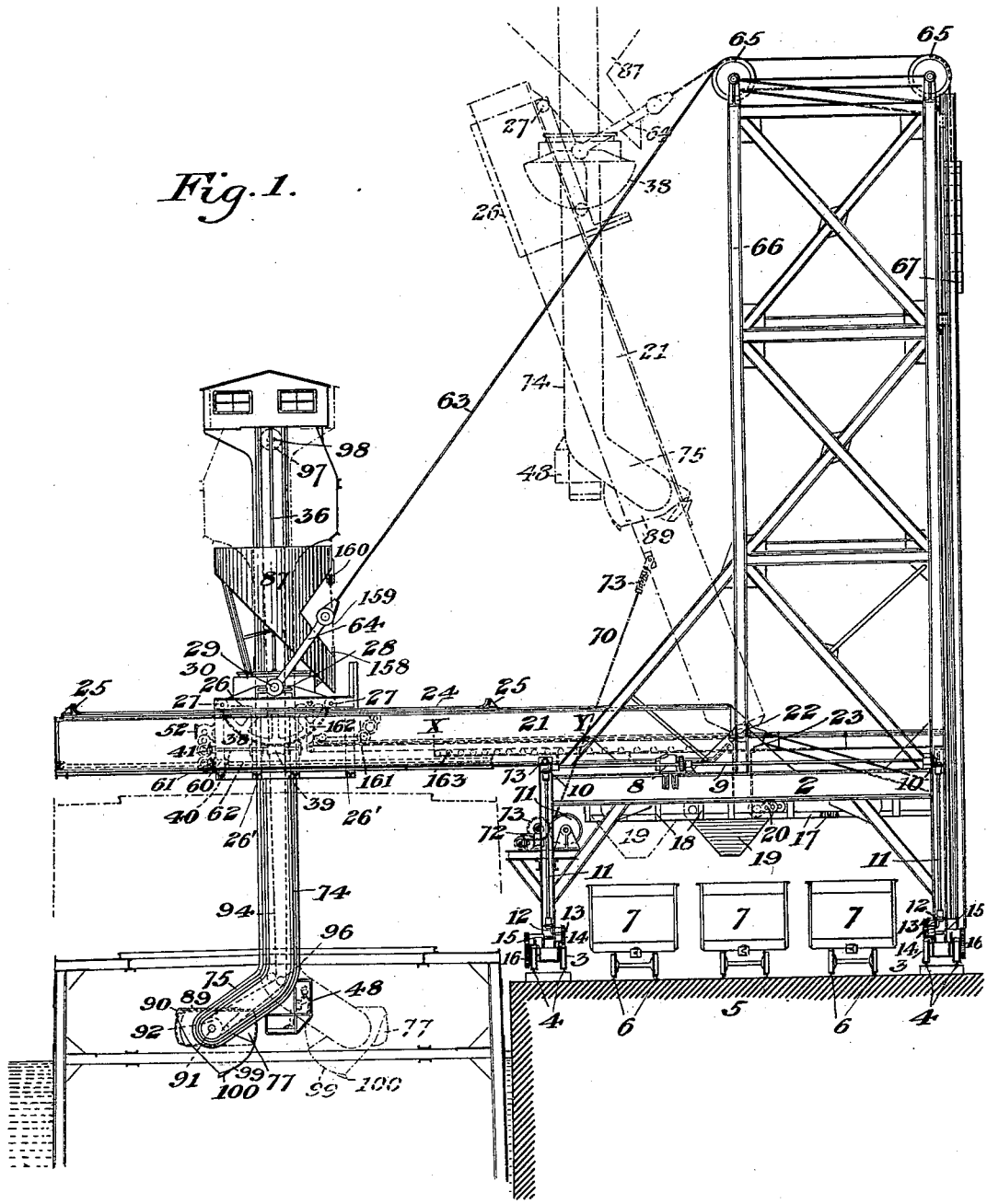
Figure 2:
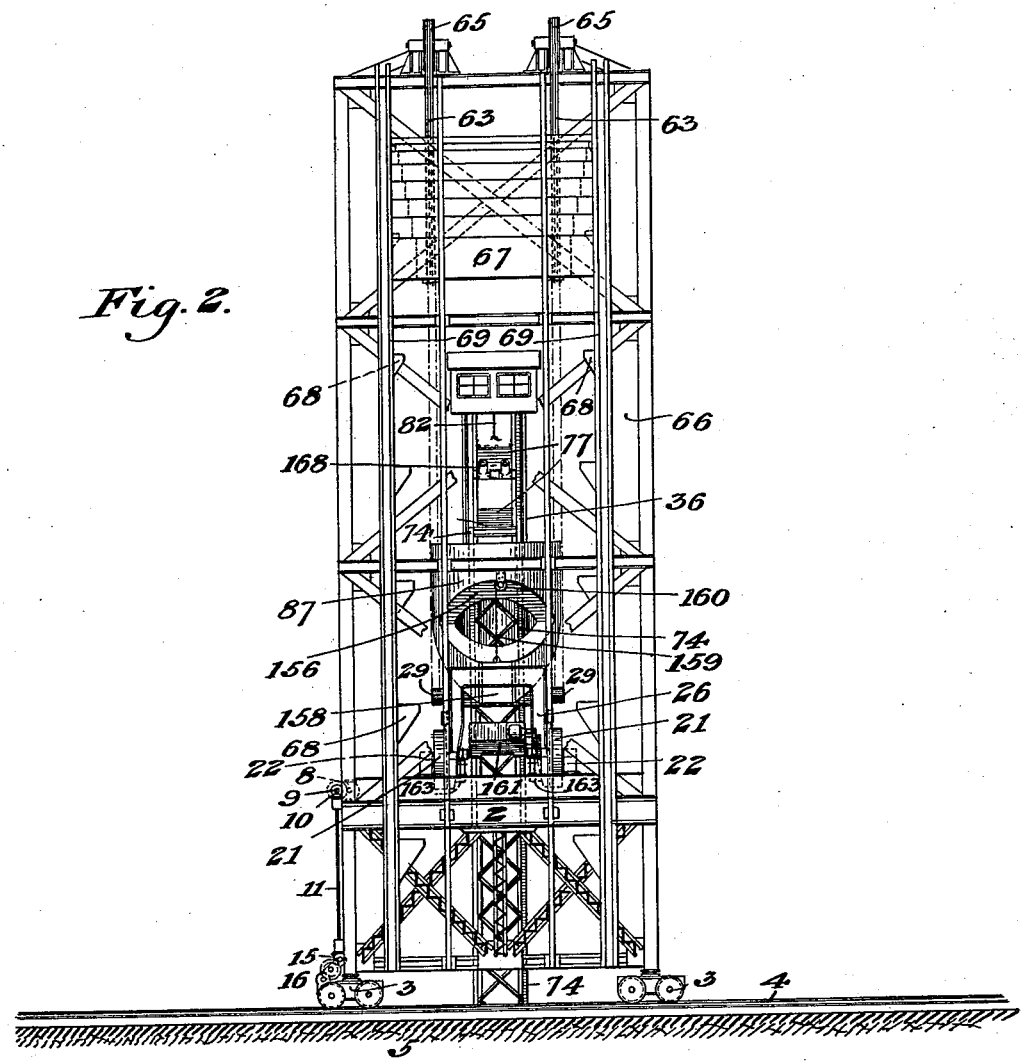
Figure 15:
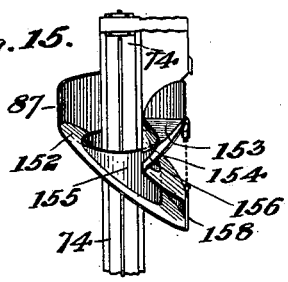
Figures 3, 4:
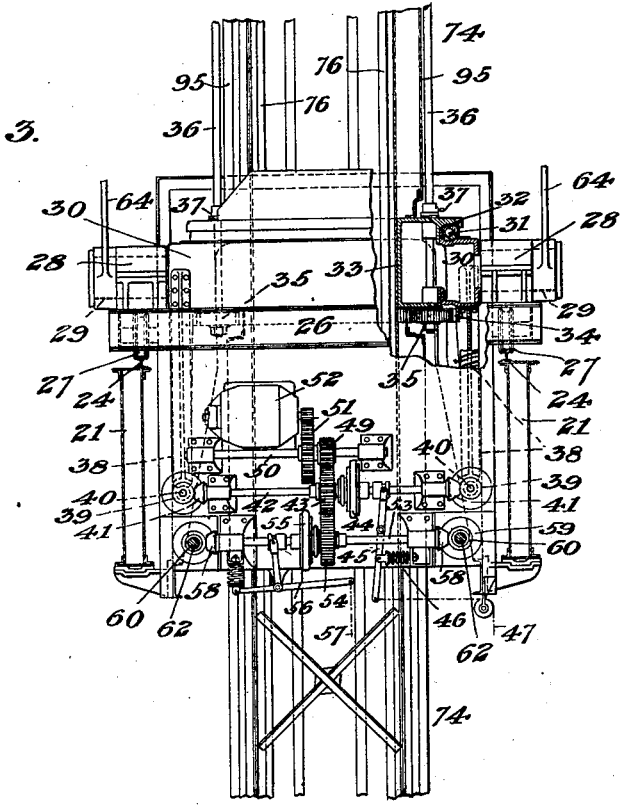
Figure 10:
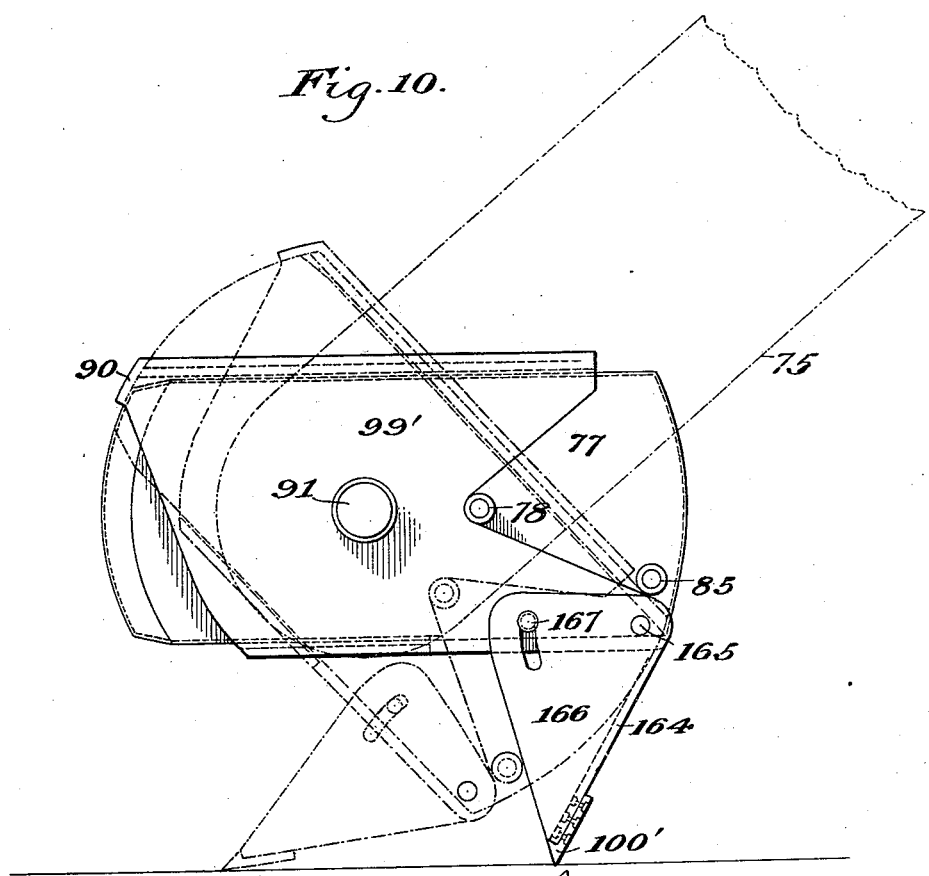
Figure 11:
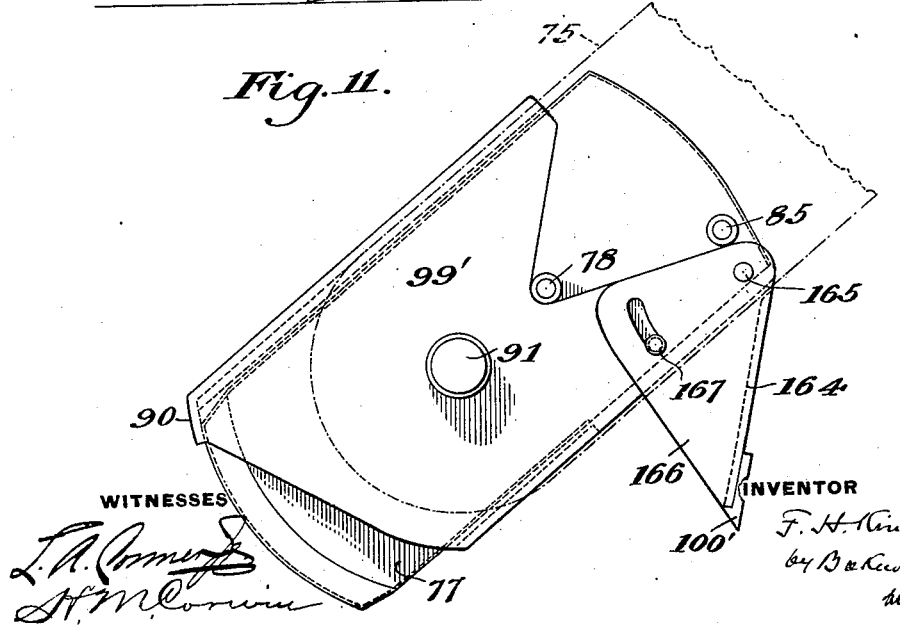
Figure 12:
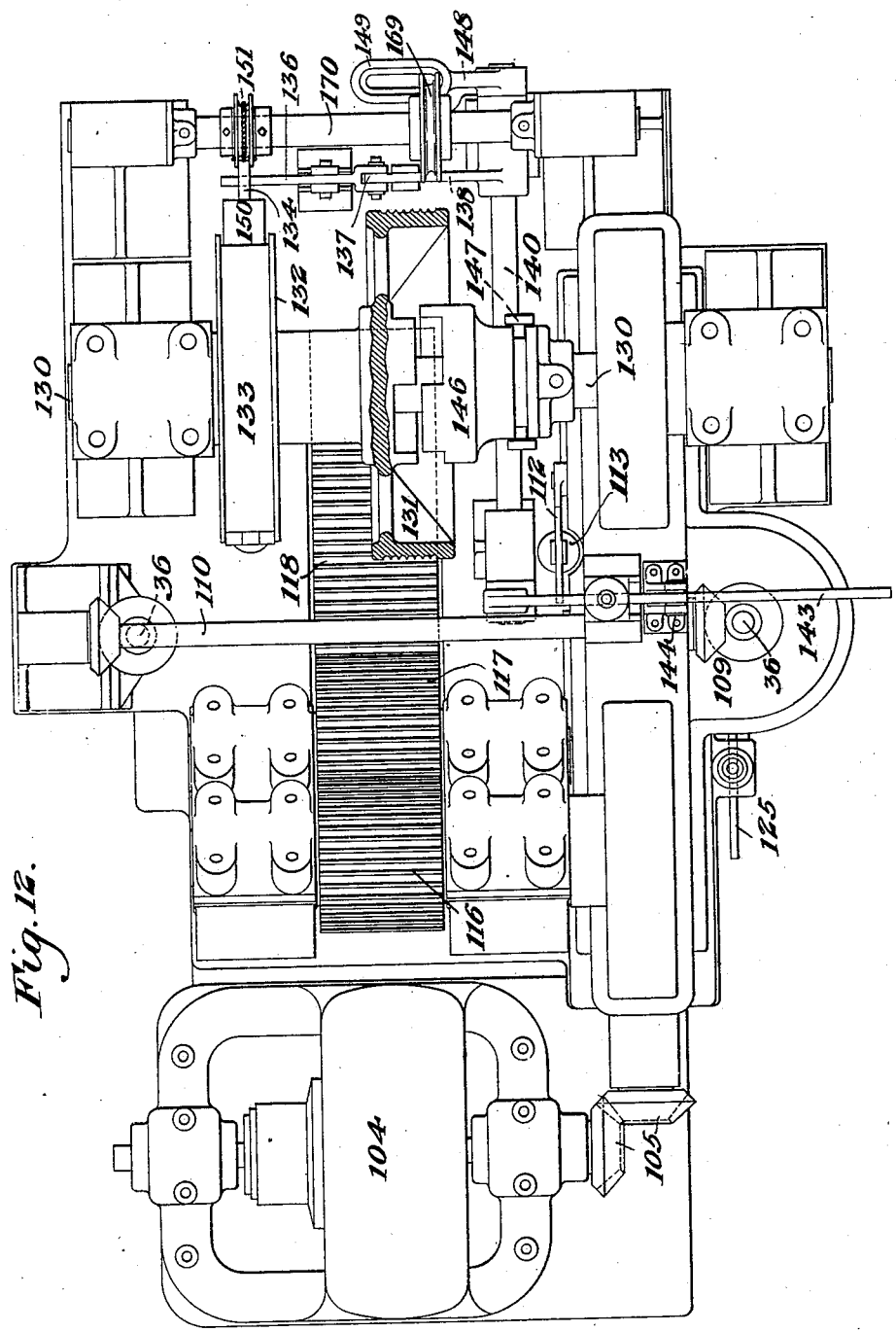
Figure 13:
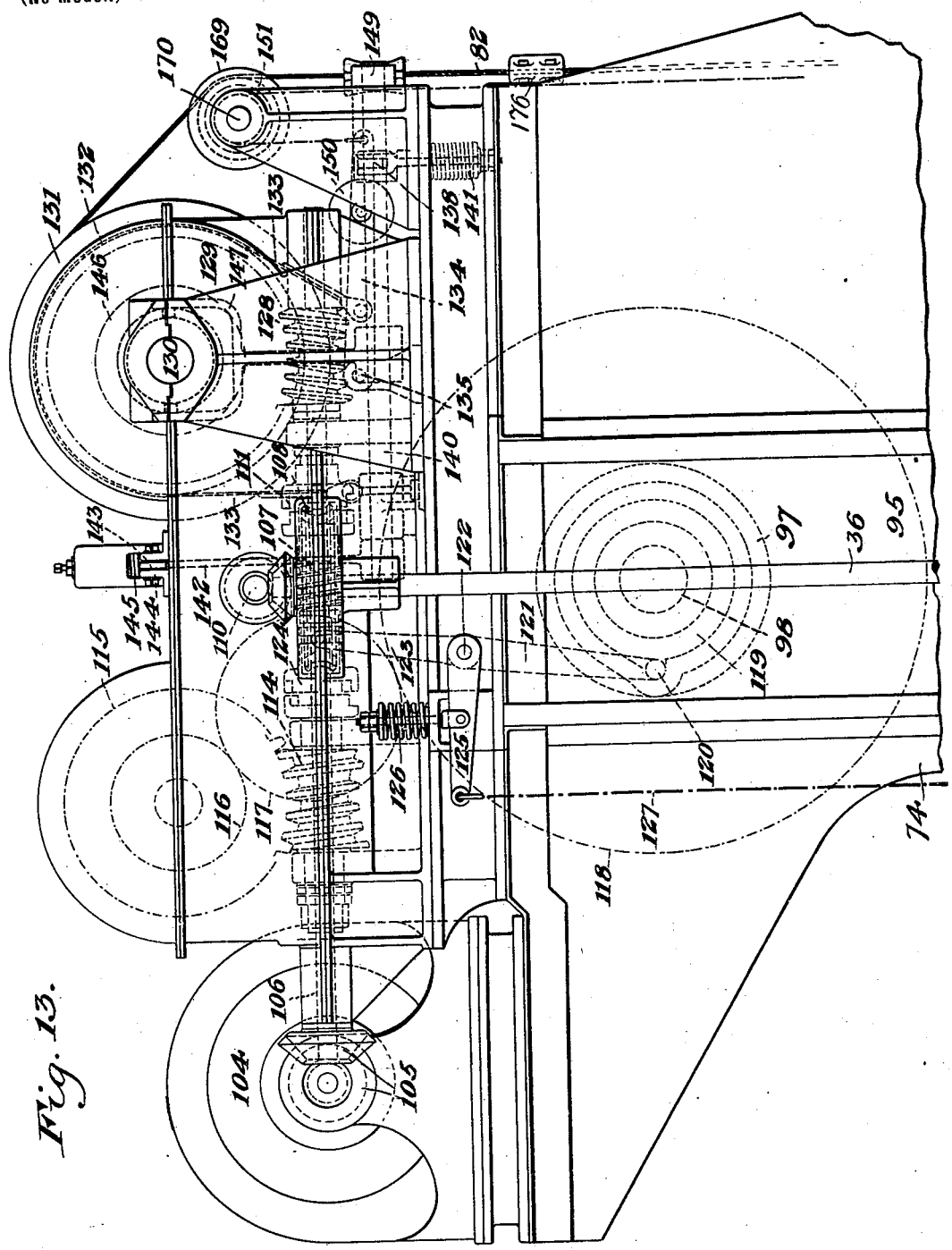
Figure 14:
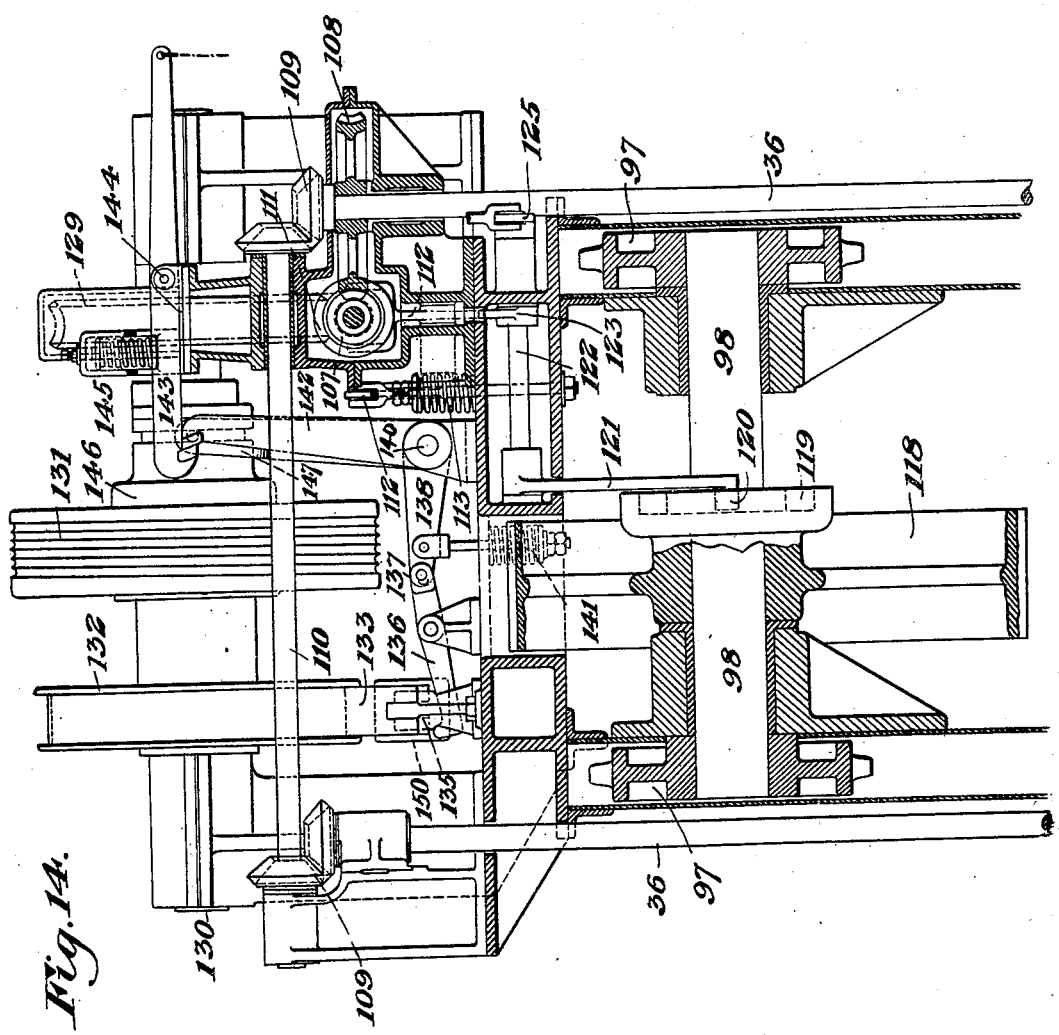

Figure 1 is a side elevation showing a preferred form of my unloading apparatus in position for unloading ore from a boat. Fig. 2 is a rear elevation of the apparatus with the bracing partly broken away. Fig. 3 is a partial front elevation, partly broken away, of the trolley and its attachments. Fig. 4 is a horizontal cross-section of the leg on a line above the turn-table. Fig. 5 is a side elevation, partly broken, away on a larger scale, which shows the top portion of the trolley and leg. Fig. 6 is a vertical central section taken through the bottom portion of the leg with the bucket in place in the holder. Fig. 7 is a side elevation of the bucket-holder. Fig. 8 is a front elevation, partly broken away, of the bucket-holder and bucket. Fig. 9 is a detail view of the bail mechanism for the bucket. Figs. 10 and 11 are side elevations showing a modified form of the bucket-holder and bucket in different positions. Fig. 12 is a top plan view showing the automatic mechanism at the top of the leg. Fig. 13 is a side elevation of the same. Fig. 14 is a front elevation, partly in section, of the said automatic mechanism. Fig. 15 is a detail vertical section of the hopper. Fig. 16 is a detail side elevation of a traveling track system I employ. Fig. 17 is a partial top plan view of the same, and Fig. 18 is a vertical cross-section.

My invention relates to the unloading of granular or lump material, and more especially to the unloading of ore from boats or vessels.

The object of the invention is to provide an improved apparatus supported on a framework alongside the vessel and by means of which all parts of the hold may be reached and the material rapidly lifted therefrom and discharged into cars or at the point desired.

One of the main objects of my invention is to provide an apparatus which will not be liable to injury from movements of the vessel during the unloading.

In the drawings I show a traveling framework 2, mounted on wheeled trucks 3, which travel on tracks 4 on the dock 5, extending parallel with the side of the boat. The tracks 4 are located some distance apart, and between them are located tracks 6, on which may travel cars 7, into which the ore is to be discharged.

The framework which supports the entire apparatus is moved along its tracks by means of an electric motor 8, geared to a horizontal shaft 9, having at both ends beveled gearing 10, intermeshing with vertical shafts 11, which are connected by bevel-gearing 12 with stub-shafts 13. The stub-shafts have connections, through toothed gearing 14, with shafts 15, having toothed-gearing connections 16 through idlers with the axles of the trucks. By means of the reversing-controller for the electric motor the apparatus may be traversed in either direction along the tracks to bring it to the desired point for operating upon the material. Along the central portion of the main framework and extending longitudinally of it are two rails 17, carried on suitable hangers 18, between which is mounted a traveling hopper 19, supported upon wheels resting on these tracks. The hopper is moved along the tracks by means of a motor mounted thereon and having gearing connection with one of its axles, as indicated at 20. At a point above these hopper-tracks is pivoted a swinging bridge 21, mounted on trunnions 22, carried in bearings 23. This bridge is composed of side beams or girders spaced apart and secured together by suitable bracing and having track members 24 secured to their top faces. The track members 24 are provided with stops 25 at their ends, these tracks extending a portion of the length of the bridge. Upon such tracks is mounted a trolley 26, consisting of a suitable framework mounted on wheels 27. The trolley is provided with bracket-arms 26', having suitable shoes which engage with the under side of the bridge 21 and prevent the trolley from tipping as the bridge and leg are tilted or during the digging operation. Upon this framework are side bearings 28, in which are supported trunnions 29, projecting in opposite directions from a supporting-frame 30 for a turn-table. This turn-table support 30 consists of a circular ring through which the leg projects, this ring having a top circular track containing balls 31, upon which rests a similar track 32, secured to a turn-table 33, to which the leg is secured. On the bottom of the turn-table-supporting member is a downwardly-projecting internal gear or rack 34, with which intermesh two oppositely-located gear-wheels 35, secured to the lower ends of vertical shafts 36, mounted in suitable bearings 37 upon the turn-table and extending upwardly to the automatic mechanism at the top of the elevator-leg. A rotary movement of the leg is thus secured. The tilting movement of the leg as a whole is obtained by means of two semicircular racks 38, secured to and projecting downwardly from the turn-table-supporting frame on opposite sides and provided with worm-teeth. With these worm-teeth intermesh two worms 39, mounted upon shafts 40. The worms and worm-wheels constitute what are known as "Hindley" worm-gears, and the teeth upon the worm-wheels are cut in opposite directions, being right-hand upon one side and left-hand upon the other side of the trolley. The worm-shafts 40 are mounted in suitable bearings on the trolley and connect at their ends, through bevel-gearing 41, with a common horizontal shaft 42, having a toothed wheel 43 loosely mounted thereon and arranged to be connected to the shaft 42 by a friction-clutch 44, operated through lever 45. The spring 46 normally holds the clutch in open position, and the lever is operated to close the clutch against the action of the spring by cord or rope 47, extending down to the operator's cage 48, secured near the lower end of the leg. The toothed wheel 43 intermeshes with pinion 49 on counter-shaft 50, having gear connections 51 with the electric motor 52, mounted on the trolley-frame. The controller for this electric motor is located in the operator's cage. In order to enable the same electric motor 52 to also move the trolley along its track, I provide a horizontal shaft 53 upon the trolley below the shaft 42, this shaft 53 having a toothed wheel 54 loosely mounted thereon and intermeshing with the toothed wheel 43. The wheel 54 is arranged to be connected to the shaft by friction-clutch 55, operated from spring-pressed lever 56, having the cord 57 extending down to the operator's cage. At the ends of the shaft 53 are provided bevel-wheels 58, intermeshing with corresponding bevel-wheels 59 upon hollow nuts 60, mounted in bearings 61 upon the trolley-frame. Through these nuts extend threaded shafts 62, which are secured between the side members of the bridge and extend parallel therewith. By operating the shaft in either direction the trolley and leg are thus moved back and forth along the track as desired.

In order to carry the load, consisting of the bridge, trolley, and leg, I provide wire cables 63, which are connected to links 64, pivoted to the outer ends of the trunnions 29 of the turn-table-supporting frame 30, these cables extending over two pairs of sheaves 65, located near the top corners of a vertical framework 66. I have shown each of these cables as consisting of four wire ropes, each rope having its individual groove in the sheave. The end portions of these cables extend downwardly at the rear of the vertical framework and are secured at their lower ends to a counterweight 67, and above this counterweight 67 are placed a set of similar counterweights, through which the cables extend, these upper counterweights having at their ends successively deeper recesses from the top downward, as indicated in dotted lines in Fig. 2, so that when the bridge is in horizontal position the entire system of counterweights becomes effective, while as the bridge swings up from horizontal position to the position shown in dotted lines in Fig. 1 these counterweights will be successively caught upon and supported by pairs of inwardly-projecting brackets 68, which are of successively-increasing width downwardly. The ends of the counterweights are guided by vertical strips or guides 69 to prevent their swaying during the swinging of the bridge, and the object of this system is to compensate for the varying load upon the cables as the bridge is hoisted, owing to its successively different angular positions. The weight of the combined counterweights is more than sufficient to counterbalance the bridge and parts supported thereon, and the bridge is held in horizontal position and is drawn downwardly into such position by means of cables 70, extending from its side members to winding-drums 71, mounted upon the frame 2 and actuated through gear connections 72 with an electric motor mounted upon the frame. The cables 70 extend upwardly through stirrups 73, pivoted to the bridge, and are secured to caps which rest upon nested spiral springs. The downward pull of the cables is therefore exerted upon a yielding resistance, and when the bucket is digging the material from the boat the motion of the boat exerting a lift on the leg will swing the bridge upwardly and compress the springs, which thus prevents injury to the bottom of the boat or mechanism that would result from a rigid construction. The leg 74 is constructed in hollow form, as shown in Fig. 4, and suitably secured to the turn-table through which it extends. The lower end portion 75 of the leg extends at an angle, as shown in Figs. 1 and 6, and within the hollow leg are provided longitudinal guides 76, which extend vertically within the vertical portion of the leg and thence curve to an inclined position in the inclined lower part of the leg, as shown in Fig. 6. The bucket 77 is provided with oppositely-projecting trunnions 78, carried in forked bearings upon hangers 79, the hangers connecting, through pivoted links 80, with a cross-bar 81, to which is centrally secured the lifting-cable 82. The bucket moves within the hollow leg, and to guide it in its up-and-down movements I provide rollers 83, pivoted to stub-shafts projecting outwardly from arms 84 upon the hangers 79 and links 80, these rollers moving within the guides and the arms projecting through the open side of the guides. The bucket is provided at its top with oppositely-projecting stub-shafts, carrying rollers 85, which engage guides 86 at the hopper portion of the leg and act to tilt the bucket into the position shown in Fig. 5, and thus dump the material into the hopper 87. These rollers also engage guides 88, located at the bend of the leg on opposite sides, and thus serve as additional guides while the bucket is rounding the bent portion of the leg. At the lower end of its travel the bucket enters a bucket-holder 89, and the trunnions of the bucket rest within V-shaped notched portions in the sides of the bucket-holder, the bottom of the bucket resting against supports 90 at the bottom of the bucket-holder. The bucket-holder consists of a hollow case open at both ends and provided with side trunnions 91, which project through stationary bearings 92 at the bottom of the leg and are provided at their ends with sprocket-wheels 93, around which extend sprocket-chains 94, which extend upwardly within outer casings 95, secured to the opposite sides of the leg. At the bend of the leg the sprocket-chains extend over guiding sprocket-wheels 96, as indicated in dotted lines in Fig. 6, and at their upper ends the chains pass over sprocket-wheels 97, secured to a shaft 98 at the top of the leg and which is actuated by mechanism hereinafter described. By means of these sprocket-wheels the bucket-holder and contained bucket are rotated to scrape up the bucket load of ore, and to assist in this action I form one end of the holder in curved shape, as shown at 99, and provide it with a removable knife or transverse cutter 100. To hold the bucket against the opposite side of the holder, I provide the transverse shaft 101, between which and the opposite side of the holder the bucket is held during the turning. The opening of the bucket is in the upper part of its side, extending the full width of the bucket inside the curved end portion 99 of the bucket-holder. When the bucket is in position in the holder, the bails or hangers drop below the bucket-trunnions, as shown in dotted lines in Fig. 6 and also in full lines in Figs. 8 and 9. A free rotation of the bucket is thus allowed, the lower ends of the bails resting on the bearings for the holder-trunnions. To hold the bucket in the holder during the rotation, I provide circular guides 102, which project inwardly from the opposite sides of the leg and fit neatly against the sides of the holder. These guides are preferably formed as a part of the castings which form the bearings for the holder and are slotted, as indicated at 103, to allow the bucket-trunnions to enter them. As the bucket-holder revolves the rollers on the bucket-trunnions travel upon the inner faces of these circular flanged guides, which thus prevent the bucket from dropping out of place during its rotation and filling.

I will now describe the mechanism mounted at the top of the leg and by means of which the leg is rotated, the bucket-holder rotated, and the lifting and lowering of the bucket accomplished. These various motions are all obtained from an electric motor 104, having bevel-gear connections 105 and a main driving-shaft 106. For rotating the leg I provide upon this shaft a loose worm 107, which intermeshes with a worm-wheel 108 upon one of the vertical shafts 36. These two shafts 36 are provided at their upper ends with bevel-gear connections 109 to a common shaft 110. The worm is arranged to be connected to the driving-shaft by a clutch 111, actuated by lever 112, which is acted upon by springs 113 to hold the clutch in open position, the lever having a cord leading down to the operator's cage.

To rotate the bucket-holder, I provide a loose worm 114 on the driving-shaft, which intermeshes with the worm-wheel 115 upon a shaft carrying a toothed wheel 116, intermeshing with toothed wheel 117, which in turn meshes with a large toothed wheel 118, which is secured to the transverse shaft 98, carrying the upper sprocket-wheels. The hub of the wheel 118 is enlarged and provided with a cam-groove 119, which is circular for the major portion of its length and is provided at one point with a jog or offset portion 120, as shown in Fig. 13. In this groove moves a roller upon a pin projecting from a lever-arm 121, secured to a rock-shaft 122, which is provided with an arm 123, having a forked connection with the clutch 124, which is arranged to connect the loose worm 114 to the driving-shaft. A third lever-arm 125 is secured to the rock-shaft and is normally drawn upwardly by spring 126. The lever is drawn down against the action of the spring by operating-cord 127, leading down to the operator's cage.

To raise and lower the bucket and to dump it, I provide a worm 128, secured to the driving-shaft and intermeshing with worm-wheel 129, secured to a shaft 130, upon which is loosely mounted a winding-drum 131. This winding-drum is formed integrally with the disk member 132 of a band-brake, the band being indicated at 133. The one end of the brake-band is secured to the intermediate part of the lever 134, pivoted at 135 and having a projecting end portion arranged to be engaged by a lever 136, having a loose slotted connection at one end 137 with a lever 138, secured to a rock-shaft 140. The lever 138 is normally drawn downwardly by rod connection with a spring 141. The rock-shaft 140 is provided with a finger 142, whose upper end engages a latch 143, pivoted to 144 and normally pressed downwardly by spring 145 to hold the latch in engagement. The outer end of the latch-lever is provided with a cord leading to the operator's cage, and when the cord is drawn down the latch is released and the spring 141 draws down the lever 138 and loosens the band-brake, throwing the brake out of action. The hoisting-drum is arranged to be secured to its shaft by a clutch 146, actuated by a forked lever 147, keyed to the rock-shaft 140. At one end of this rock-shaft is secured an arm 148, having a loop-shaped stop 149, through which the cable for hoisting the bucket extends. A tappet 176 is secured to the hoisting-cable in such position that as the bucket reaches the upper end of its travel the tappet will strike the stop-arm and rock the shaft 140, thus detaching the drum-clutch and at the same time applying the band-brake by the mechanism above described. The bucket now being dumped, the friction upon the disk member 132 will hold the bucket until the brake action is partially relieved by the operator, when its weight will cause it to descend the leg, and to regulate its descent I provide a counterweight 150 upon the lever 134, which is adjustable along the lever, and the operator can thus regulate or stop the downward movement of the bucket by his cord leading from the counterweighted lever over a suitable pulley 151 and thence to the cage. The controller for the electric motor at the top of the leg is located in the operator's cage, so that he has under full control the movements of the leg, bucket, and bucket-holder as well as the movement of the trolley.

The hopper 87 is of annular form and provided with an inclined bottom 152. At an intermediate point in the side of the hopper is provided a splitting device 153, having at its inner end curved wings or shields 154. This splitter, with its wings, is secured to the leg which extends centrally through the hopper, the wings moving around the upper end of a portion of the cylinder 155. In order to prevent the ore from dropping freely the entire depth of the hopper on its deeper side, I provide an oppositely-inclined bottom portion 156, which projects inwardly and is secured at its inner end to the cover or top portion 157 for the lower part of the hopper. This lower end of the hopper is provided with a vertically-movable door 158, which is actuated by cord 159, leading over sheave 160. Beneath the outlet-door of the hopper I provide an ore-car, (indicated at 161,) this car having wheels with a central flange, with two treads on opposite sides thereof arranged to run upon two sets of tracks 171 and 172. The rails of the outer track extend from the pivotal point of the bridge inwardly to the point marked X, while the rails of the inner track located between the outer rails are pivoted at their outer ends to links 162, pivotally connected to the trolley at 173, the inner portions of these rails resting upon a set of transverse rollers 163. When the parts are in the position shown in Fig. 1, the inner rails extend to the point marked Y, and as the trolley is moved back and forth on the bridge the inner rails move over the rollers on which they rest and constitute movable extensions of the main track. A small electric motor 174 is mounted upon the ore-car for moving it back and forth on both sets of rails, and after it has received its load from the hopper it is moved back on the inner rail until its outer treads strike the outer rails, after which it is moved thereon to a point over the movable hopper. The ore is then dumped into the hopper and therefrom into the car on the track beneath. The rails of the movable track are secured by suitable stringers 175, which are rigidly braced together.

In Figs. 10 and 11 I show a modified form of the bucket-holder, in which the side 99' of this holder is parallel with the opposite side and cut away to form an opening registering with the opening in the bucket. A transverse casting 164 is pivoted to the bucket-holder at 165 and provided with side wings 166, having arc-shaped slots engaging projecting guides 167 on the holder. The cutter 100' is secured to the casting, and as the bucket-holder rotates the swinging casting will take the successive positions shown in these figures, and thus accommodate itself to the bottom of the boat and the movements of the boat. When this construction is used, the yielding spring devices for the holding-down cables may be done away with, if desired.

In operating the apparatus the motor 8 is actuated to move the apparatus along the dock to the desired position alongside the boat, the bridge and leg being at this time in the position shown in dotted lines in Fig. 1. The drawing-down cables are then actuated through their motor connections and the bridge swung down into horizontal position, the leg entering a hatch of the vessel, the parts assuming the position shown in full lines in Fig. 1. The trolley is moved along the bridge to bring the leg to the proper point. The operator in the cage at the lower part of the leg brings the leg into the desired position by actuating the motor for turning the leg or that for swinging the leg, or both, and by moving the trolley along its track. By means of the cord connections to the automatic mechanism at the top of the leg he then starts the rotation of the bucket-holder with its contained bucket by drawing upon the clutch-cord and releases this cord as the bucket-holder starts to move. The bucket-holder makes one complete turn, and as it reaches its original position with the load scooped into the bucket the automatic throw-off at the top of the leg stops it at this point. The operator then operates the cord for the drum-clutch, and the hoisting-cable drawing upon the bale mechanism causes the bale to engage the trunnions of the bucket and draw it upwardly within the hollow leg. As the bucket nears the top of its travel its top trunnions contact with the guides 86, and the bucket is thereby gradually tilted during its upward movement until its body strikes the spring-buffers 168. During the lifting and lowering of the bucket the loose sheave 169, over which it extends at the top of the leg, moves along its supporting-shaft 170 a distance equal to the length of the slot in the stop-lever. As the bucket reaches its inverted position the tappet on its cable strikes the stop-lever, and thereby through the connections above described throws off the operating-clutch for the hoisting-drum, and at the same time throws on the band-brake, which is held with a yielding pressure by the counterweighted lever. The operator then releases the brake and the bucket starts back by gravity and moves down within the leg and into the holder under the control of the brake. The ore which has been dumped into the hopper slides down into the lower portion and is dumped into the ore-car, as desired. After the desired amount has been taken out from one hatch the holding-down cables are unwound a sufficient distance to allow the lower part of the leg and the bucket-holder to rise above the deck of the vessel, the counterweights acting to swing the bridge upwardly when the holding-down cables are unwound. The cables are then drawn down to move the leg into the next hatch, the apparatus having been moved along the dock to the desired point.

Many variations may be made in the form and arrangement of the general frame, the tilting bridge, the trolley, leg, bucket-holder, and other parts as well as in the actuating mechanism without departing from my invention as defined in my broader claims.

I claim—

1. In unloading apparatus a pivoted beam, mechanism for swinging the beam, a turn-table mounted on the projecting arm of the beam, an elevator pivotally supported on the turn-table, and mechanism for swinging the elevator; substantially as described.

2. In unloading apparatus, a swinging beam, a trolley movable along the beam, a rotary turn-table carried on the trolley, and a depending elevator mounted on the rotary turn-table; substantially as described.

3. In unloading apparatus, a swinging beam, a trolley movable along the beam, a rotary turn-table mounted on the trolley, a depending elevator pivotally supported on the turn-table, and mechanism for swinging the elevator to change its angle; substantially as described.

4. In unloading apparatus a traveling framework mounted on the dock, a beam pivotally mounted thereon and arranged to project over a vessel, a trolley movable along the beam, a rotary turn-table mounted on the trolley, and a depending elevator mounted on the turn-table; substantially as described.

5. In unloading apparatus, a pivoted beam, a trolley movable along the beam, a rotary frame mounted on the trolley, and an adjustable elevator mounted on the rotary frame; substantially as described.

6. In unloading apparatus, a longitudinal support, a trolley movable along the support, a rotary turn-table carried on the trolley, an elevator mounted on the rotary turn-table and extending downwardly therefrom, and mechanism for changing the angle of the elevator; substantially as described.

7. In unloading apparatus, a rotary turn-table, an elevator supported thereon and extending down through the turn-table in all its positions, and mechanism for swinging the elevator to change its angle; substantially as described.

8. In unloading apparatus, a horizontal beam or support, a trolley movable thereon, a rotary turn-table mounted on the trolley, and an elevator-leg pivoted to the turn-table and extending above and depending below it, and a hopper supported upon and movable with the turn-table; substantially as described.

9. In unloading apparatus, a pivoted beam, a trolley movable along the beam, a turn-table mounted on the trolley, an elevator-leg pivotally mounted upon the turn-table, a receiving-hopper mounted upon the turn-table, and conveying mechanism arranged to transfer the material from the hopper to the rear end of the beam over the dock; substantially as described.

10. In unloading apparatus, a rotary turn-table, an annular hopper mounted thereon, an elevator-leg extending downwardly through the turn-table, and mechanism for tilting the turn-table support; substantially as described.

11. In unloading apparatus, a trunnioned turn-table support, mechanism for tilting the support, an annular hopper mounted thereon, an elevator-leg extending through the hopper and mounted on a turn-table, and mechanism for turning the leg within the hopper; substantially as described.

12. In unloading apparatus, a swinging beam carrying elevator mechanism, and yielding mechanism arranged to hold the beam in position with the elevator within a boat; substantially as described.

13. In unloading apparatus, a swinging beam carrying elevator mechanism, a counterweight system connected thereto, and draw-down cables arranged to move the beam into horizontal position against the action of the counterweights; substantially as described.

14. In unloading apparatus, a swinging beam carrying elevator mechanism, a counterweight system connected thereto, and draw-down cables arranged to move the beam into horizontal position against the action of the counterweights, said cables having yielding connections to the beams; substantially as described.

15. In elevator mechanism, a stiff depending leg, a single bucket movable up and down the leg in the same path, connections for raising and lowering the bucket, and mechanism for giving the bucket the major portion of a revolution when at the lower end of its path; substantially as described.

16. In elevator mechanism, a depending leg having a movable holding device in its lower portion, a bucket arranged to be engaged and held by the said device, and means for raising and lowering the bucket out of and into engagement with the holding device; substantially as described.

17. In elevator mechanism, a depending support having bearings in its lower portion, a rotary holder mounted in said bearings, a movable bucket arranged to fit in the holder, mechanism for raising and lowering the bucket, and mechanism for rotating the holder and contained bucket; substantially as described.

18. In elevator mechanism, a depending support, a bucket arranged to be moved in the support, a rotary holding device for the bucket in the lower part of the support, and an automatic dumping device for the bucket in the upper part of the support; substantially as described.

19. In elevator mechanism, a depending leg having side guides, a bucket having projections engaging the guides, mechanism for raising and lowering the bucket, and mechanism for turning the bucket at the lower end of its path; substantially as described.

20. In elevator mechanism, a stiff depending leg, a single bucket movable up and down the leg in the same path, connections for raising and lowering the bucket, and mechanism independent of said connections for turning the bucket at the lower end of its path; substantially as described.

21. In elevator mechanism, a depending leg having a trunnioned holder in its lower portion, a bucket having detachable connections for raising and lowering it, and means for turning the holder when the said connection is severed; substantially as described.

22. In elevator mechanism, a depending leg, means for raising and lowering said leg, a turning shovel or bucket on the leg, mechanism for raising and lowering the bucket through the same path on the leg, and mechanism for turning the bucket throughout the lower end of its path; substantially as described.

23. In elevator mechanism, a depending leg having its lower portion extending at an angle to the vertical portion, a single bucket movable up and down in the same path inside the leg, and mechanism for turning the bucket while at the lower end of the leg; substantially as described.

24. In elevator mechanism, a depending leg having a pivoted holder in its lower portion, said holder having a transverse cutter, a bucket arranged to enter the holder, means for raising and lowering the bucket, and mechanism for rotating the holder containing the bucket; substantially as described.

25. In elevator mechanism, a movable bucket, a rotary holder arranged to engage the bucket when lowered thereinto, and lifting-arms provided with pockets to receive trunnions on the skip and allow movement of the arms relatively to the bucket; substantially as described.

26. In elevator mechanism, a bridge, a tilting beam thereon, a movable depending leg supported at the forward end of the beam, a bucket arranged to be moved up and down the leg, mechanism for dumping the bucket at the upper end of its travel along the leg, and mechanism for receiving the material so dumped and transferring it along the beam to the dock; substantially as described.

In testimony whereof I have hereunto set my hand.

FREDERICK H. KINDL.

Witnesses:
H. M. CORWIN,
L. A. CONNER, Jr.